United States Patent
Vigholm et al.

(10) Patent No.: US 10,377,223 B2
(45) Date of Patent: Aug. 13, 2019

(54) WORKING MACHINE ARRANGED WITH MEANS TO DRIVE AND CONTROL A HYDRAULIC PUMP

(71) Applicant: VOLVO CONSTRUCTION EQUIPMENT AB, Eskilstuna (SE)

(72) Inventors: Bo Vigholm, Stora Sundby (SE); Andreas Ekvall, Hallstahammar (SE)

(73) Assignee: Volvo Construction Equipment AB, Eskilstuna (SE)

( * ) Notice: Subject to any disclaimer, the term of this patent is extended or adjusted under 35 U.S.C. 154(b) by 31 days.

(21) Appl. No.: 15/573,253

(22) PCT Filed: May 13, 2015

(86) PCT No.: PCT/SE2015/050542
§ 371 (c)(1),
(2) Date: Nov. 10, 2017

(87) PCT Pub. No.: WO2016/182487
PCT Pub. Date: Nov. 17, 2016

(65) Prior Publication Data
US 2018/0118013 A1 May 3, 2018

(51) Int. Cl.
*B60K 6/46* (2007.10)
*B60K 25/02* (2006.01)
(Continued)

(52) U.S. Cl.
CPC ............... *B60K 6/46* (2013.01); *B60K 25/02* (2013.01); *B60W 10/06* (2013.01); *B60W 10/08* (2013.01);
(Continued)

(58) Field of Classification Search
CPC .... B60K 2025/026; B60K 25/02; B60K 6/46; B60W 10/06; B60W 10/08; B60W 10/30;
(Continued)

(56) References Cited

U.S. PATENT DOCUMENTS 9,151,017 B2 * 10/2015 Kaneko ................. E02F 9/2075
2002/0148144 A1 10/2002 Tokunaga
(Continued)

FOREIGN PATENT DOCUMENTS

EP 2322398 A2 5/2011
EP 2815943 A1 12/2014
(Continued)

OTHER PUBLICATIONS

International Searth Report (dated feb. 1, 2016) for corresponding International App. PCT/SE2015/050542.
(Continued)

*Primary Examiner* — Tyler J Lee
(74) *Attorney, Agent, or Firm* — WRB-IP LLP (57) ABSTRACT

A working machine that includes an internal combustion engine, a generator, an energy storage and an electric motor for driving one or more wheels of the working machine is provided. The internal combustion engine is arranged to drive the generator and the generator is arranged to supply power to the electric motor via the energy storage. The working machine further includes an accelerator for controlling the electric motor, and a hydraulic pump for driving a hydraulic actuator. The hydraulic pump has a drive source different from the electric motor and the accelerator is arranged for controlling the speed of the hydraulic pump.

18 Claims, 6 Drawing Sheets

(51) Int. Cl.
  *B60W 10/06* (2006.01)
  *F04B 17/05* (2006.01)
  *E02F 9/20* (2006.01)
  *B60W 20/15* (2016.01)
  *B60W 10/08* (2006.01)
  *B60W 10/30* (2006.01)
  *B60W 30/188* (2012.01)
  *F04B 49/20* (2006.01)
  *E02F 9/22* (2006.01)

(52) U.S. Cl.
  CPC ............ *B60W 10/30* (2013.01); *B60W 20/15* (2016.01); *B60W 30/188* (2013.01); *E02F 9/2075* (2013.01); *E02F 9/2095* (2013.01); *E02F 9/2235* (2013.01); *F04B 17/05* (2013.01); *F04B 49/20* (2013.01); *B60K 2025/026* (2013.01); *B60Y 2200/415* (2013.01)

(58) Field of Classification Search
  CPC ................ B60W 20/15; B60W 30/188; B60Y 2200/415; E02F 9/2075; E02F 9/2095; E02F 9/2235; F04B 17/05; F04B 49/20
  See application file for complete search history.

(56) References Cited

U.S. PATENT DOCUMENTS

| | | | |
|---|---|---|---|
| 2006/0189436 A1* | 8/2006 | Nakashima | B60W 10/02 477/174 |
| 2009/0018716 A1 | 1/2009 | Ambrosio | |
| 2009/0145121 A1* | 6/2009 | Yasuda | B60K 6/46 60/431 |
| 2010/0102767 A1* | 4/2010 | Endo | B60K 6/365 318/453 |
| 2010/0222951 A1 | 9/2010 | Tanaka et al. | |
| 2011/0048827 A1* | 3/2011 | Cherney | B60K 6/46 180/65.245 |
| 2013/0195681 A1 | 8/2013 | Meehan | |
| 2013/0230376 A1 | 9/2013 | Soma' et al. | |
| 2013/0317684 A1 | 11/2013 | Kaneko et al. | |

FOREIGN PATENT DOCUMENTS

| | | |
|---|---|---|
| JP | 2001097667 A | 4/2001 |
| JP | 2011117398 A | 6/2011 |
| WO | 2014073569 A1 | 5/2014 |
| WO | 2014157114 A1 | 2/2017 |

OTHER PUBLICATIONS

JP2005133319, May 26, 2005, Hitachi Construction Machinery (Abstract).

* cited by examiner

WORKING MACHINE ARRANGED WITH MEANS TO DRIVE AND CONTROL A HYDRAULIC PUMP

BACKGROUND AND SUMMARY

The invention relates to a working machine, a method and a control unit for controlling a working machine. The invention also relates to a control element for a working machine.

The invention can be applied on different types of working machine, for example wheel loaders and articulated haulers. Although the invention will be described hereinafter with respect to a wheel loader, the application of the invention is not restricted to this particular application, but the invention may also be used in other vehicles.

A working machine is usually provided with a bucket, container or other type of implement for digging, lifting, carrying and/or transporting a load.

For example, a wheel loader has a lift arm unit for raising and lowering an implement, such as a bucket. The lift arm unit comprises hydraulic cylinders for movement of a load arm and the implement attached to the load arm. Usually a pair of hydraulic cylinders is arranged for raising the load arm and a further hydraulic cylinder is arranged for tilting the implement relative to the load arm.

In addition, the working machine is often articulated frame-steered and has a pair of hydraulic cylinders for turning/steering the working machine by pivoting a front section and a rear section of the working machine relative to each other.

The hydraulic system generally further comprises at least one hydraulic pump, which is arranged to supply hydraulic power, i.e. hydraulic flow and/or hydraulic pressure to the hydraulic cylinders. The hydraulic pump is conventionally driven by an internal combustion engine and provides the hydraulic fluid by means of a control valve in a load sensing (LS) system. The pump is connected to a power take-off which can be located between the internal combustion engine and a transmission arrangement, such as a gear box. The transmission arrangement is in turn connected to e.g. wheels of the working machine for the propulsion thereof. In other words; both the hydraulic pump and the driveline are directly driven by the engine.

The way of operating the hydraulic actuators in a wheel loader is usually performed more or less by "on-off" control. In a loading cycle during lifting and tilting of the bucket, the operator usually uses the maximal available lever stroke. The reason is that the maximal flow provided from the pump (or pumps) is restricted due to the (low) engine speed required by the driveline. Thus, the operator uses all available power to the lift and tilt by actuating the lever for controlling the control valve. The control unit opens the control valve and increases the displacement of the variable pump to achieve the requisite flow and pressure, but the power is still limited since the engine speed is determined by the driveline.

On the other hand, in a working machine with a system where the engine drives a generator that in turn drives an electric motor, preferably via any kind of energy storage, for the propulsion of the working machine, the driveline is not directly connected to the engine. In this system there is actually no such engine speed restriction since the speed of the engine can be high without being in conflict with the speed required by the driveline.

Due to the fact that an operator of a working machine tends to use the same approach as for conventional machines also when driving this kind of machine not having any engine speed restriction caused by the driveline, the fuel consumption would increase as a consequence of using a higher pump speed if the operator was given the ability to increase the pump speed unrestrictedly.

It is desirable to provide a working machine by which the energy losses and thereby the fuel consumption can be reduced.

The invention according to an aspect thereof, is based on the insight that by the provision of a working machine that comprises an internal combustion engine, a generator, an energy storage and an electric motor for driving one or more wheels of the working machine, where the internal combustion engine is arranged to drive the generator and the generator is arranged to supply power to the electric motor via the energy storage, and the working machine further comprises an accelerator for controlling the electric motor, and a hydraulic pump for driving a hydraulic actuator, and particularly where the hydraulic pump has a drive source different from the electric motor and the accelerator is arranged for controlling the speed of the hydraulic pump, the energy losses can be reduced due to the fact that the speed of the drive source of the hydraulic pump can be restricted in a way that is similar to the characteristics of a conventional working machine where both the hydraulic pump and the driveline are directly driven by an internal combustion engine.

The balance between the machine performance and fuel save can be controlled by controlling the speed of the hydraulic pump. The speed control of the hydraulic pump is preferably configured such that the greater accelerator stroke, the higher pump speed. This can be applied up to a maximal pump speed that cannot be exceeded independently of the accelerator stroke. The restricted pump speed will save fuel for two main reasons; first, for a given flow the pump has usually higher efficiency for greater pump displacement and lower speed than for higher speed and smaller pump displacement, and second, if the operator is forced to use the maximal lever stroke in operating the hydraulics, the pressure drop over the control valve will be reduced due to an increased control valve opening. In addition, an "on-off" control of the hydraulics will facilitate the driving and give the operator more ergonomic conditions.

According to one embodiment of the invention, the drive source of the hydraulic pump is the internal combustion engine and the accelerator is arranged for controlling the speed of the hydraulic pump by controlling the speed of the internal combustion engine. According to another embodiment of the invention, the working machine comprises a further electric motor and the drive source of the hydraulic pump is said further electric motor, and the accelerator is arranged for controlling the speed of the hydraulic pump by controlling the spud of said further electric motor. For both these variants, the pump speed can be controlled and restricted in a way that is similar to the characteristics of a conventional working machine where both the hydraulic pump and the driveline are directly driven by an internal combustion engine.

According to a further embodiment of the invention, the working machine has a means for determining the speed of the drive line of the working machine, and the speed control of the hydraulic pump is dependent on the determined drive line speed. Hereby, the pump speed is not only dependent on the accelerator stroke, but also on the speed of the driveline. This means that the pump speed as a function of the accelerator stroke can be varied for different speeds of the driveline. In a diagram showing pump speed versus accelerator stroke, different curves with different maximal pump speed for instance, can represent different driveline speed.

For example, the gear position of the working machine can be determined, and the speed control of the hydraulic pump can be dependent on the determined gear position. The current gear position gives a non-complicated robust indication of the speed of the driveline. For example, if the gear position is neutral, the allowed maximal pump speed can be relatively high enabling a fast lift operation by means of the hydraulics while the power to the driveline is zero or negligible.

According to a further embodiment of the invention, the working machine has a means for determining the power or torque transmitted by the drive line of the working machine, and the speed control of the hydraulic pump is dependent on the determined power or torque. Hereby, the pump speed is not only dependent on the accelerator stroke, but also on the power consumed by the driveline. Since the internal combustion engine speed in a conventional machine is depressed if a lot of power is transmitted to the driveline, the pump speed is also restricted. Thus, this embodiment of the invention will enable the pump speed to be controlled similar to the restricted pump speed available in a conventional machine under the same operation conditions.

According to a further embodiment of the invention, the working machine has a means for determining activation of a braking device of the working machine, and the speed control of the pump is dependent on whether or not the braking device has been activated. The hydraulic pump is preferably configured such that the maximal pump speed is higher for an activated braking device than for an inactivated braking device. Hereby the pump speed can be controlled similar to the restricted pump speed available in a conventional machine under the same operation conditions. For example, the operator may increase the pump speed temporarily by activating the brake pedal at the same time as the accelerator, is activated. The increased pump speed could be further conditioned by a certain gear and/or velocity of the working machine.

According to a further aspect, the invention relates to a control element for a working machine, where the working machine has a hydraulic pump for driving a hydraulic actuator, and the control element comprises means for selecting between machine performance and fuel save by an operator of the working machine, and where the control element is designed such that a selected increased machine performance and a decreased fuel save correspond to a higher available speed of the hydraulic pump and a selected decreased machine performance and an increased fuel save correspond to a lower available speed of the hydraulic pump. Such a control lever can be arranged on a switch panel inside the cabin of the working machine. The operator is hereby able to prioritize machine performance or fuel save depending on the current working operation to be performed. For example, in a working machine where the speed control of the hydraulic pump is configured such that the greater accelerator stroke, the higher pump speed, and up to a maximal pump speed that cannot be exceeded independently of the accelerator stroke, the selection of machine performance or fuel save will displace the pump speed curve (that is a function of the accelerator stroke) towards increased and decreased pump speed, respectively.

The same advantages as discussed above with reference to the working machine can be reached by the method and the control unit according to the invention, and the control element according to the invention. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
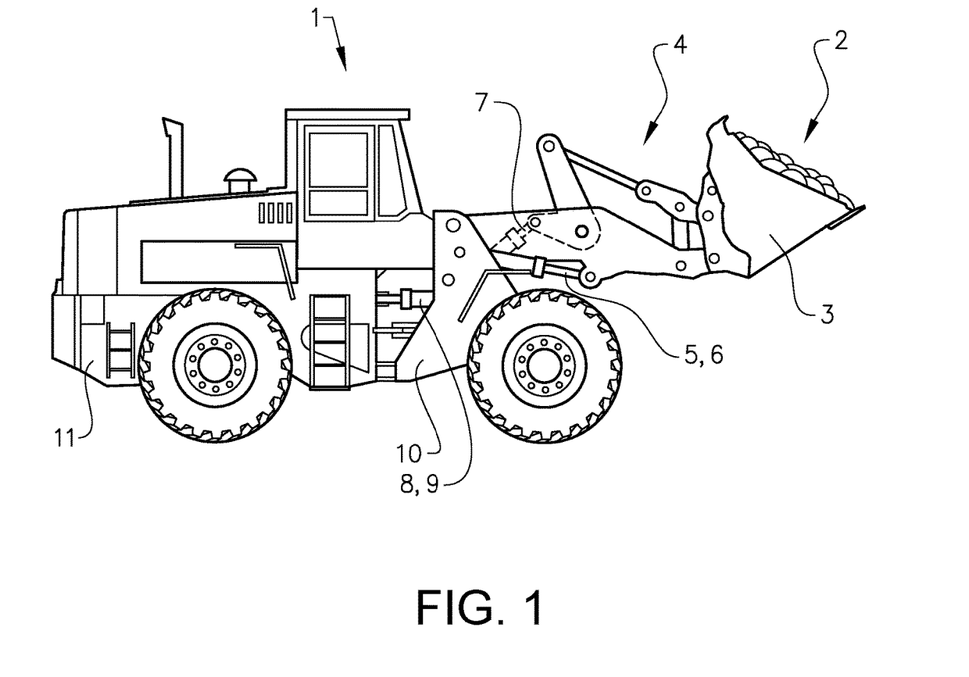
FIG. 1 is a lateral view illustrating a working, machine according to the invention.

FIG. 1 is an illustration of a working machine 1 in the form of a wheel loader. The wheel loader is an example of a working machine onto which the invention can be applied.

The wheel loader has an implement 2. The term "implement" is intended to comprise any kind of tool controlled by hydraulics, such as a bucket, a fork or a gripping tool. The implement illustrated is a bucket 3 which is arranged on a load arm 4 for lifting and lowering the bucket 3, and further the bucket can be pivoted or tilted relative to the load arm. In the example embodiment illustrated in FIG. 1 a hydraulic system of the wheel loader comprises two hydraulic cylinders 5, 6 for the operation of the load arm 4 and one hydraulic cylinder 7 for tilting the bucket 3 relative to the load arm 4.

The hydraulic system of the wheel loader further comprises two hydraulic cylinders 8, 9, steering cylinders, arranged on opposite sides of the wheel loader 1 for turning the wheel loader by means of relative movement of a front body part 10 and a rear body part 11.

In other words, the wheel loader is articulated frame-steered by means of the steering cylinders 8, 9. There is a pivot joint connecting the front body part 10 and the rear body part 11 of the wheel loader 1 such that these parts are pivotally connected to each other for pivoting about a substantially vertical axis.

The hydraulic system for the hydraulic functions is preferably a load sensing (LS) system comprising a variable pump for supplying the functions with hydraulic fluid via a control valve. The pump is suitably controlled based on the highest LS-signal from a function that is active and thus has the highest load pressure. The pump will then provide the hydraulic system with a pressure that is higher than the highest load pressure, i.e. a pressure that is the load pressure plus an offset, which offset can be about 20 bar. This means that there is a pressure drop over the control valve.

By hydraulic fluid means hydraulic oil or any other corresponding fluid suitable for a hydraulic system.

Figure 2:
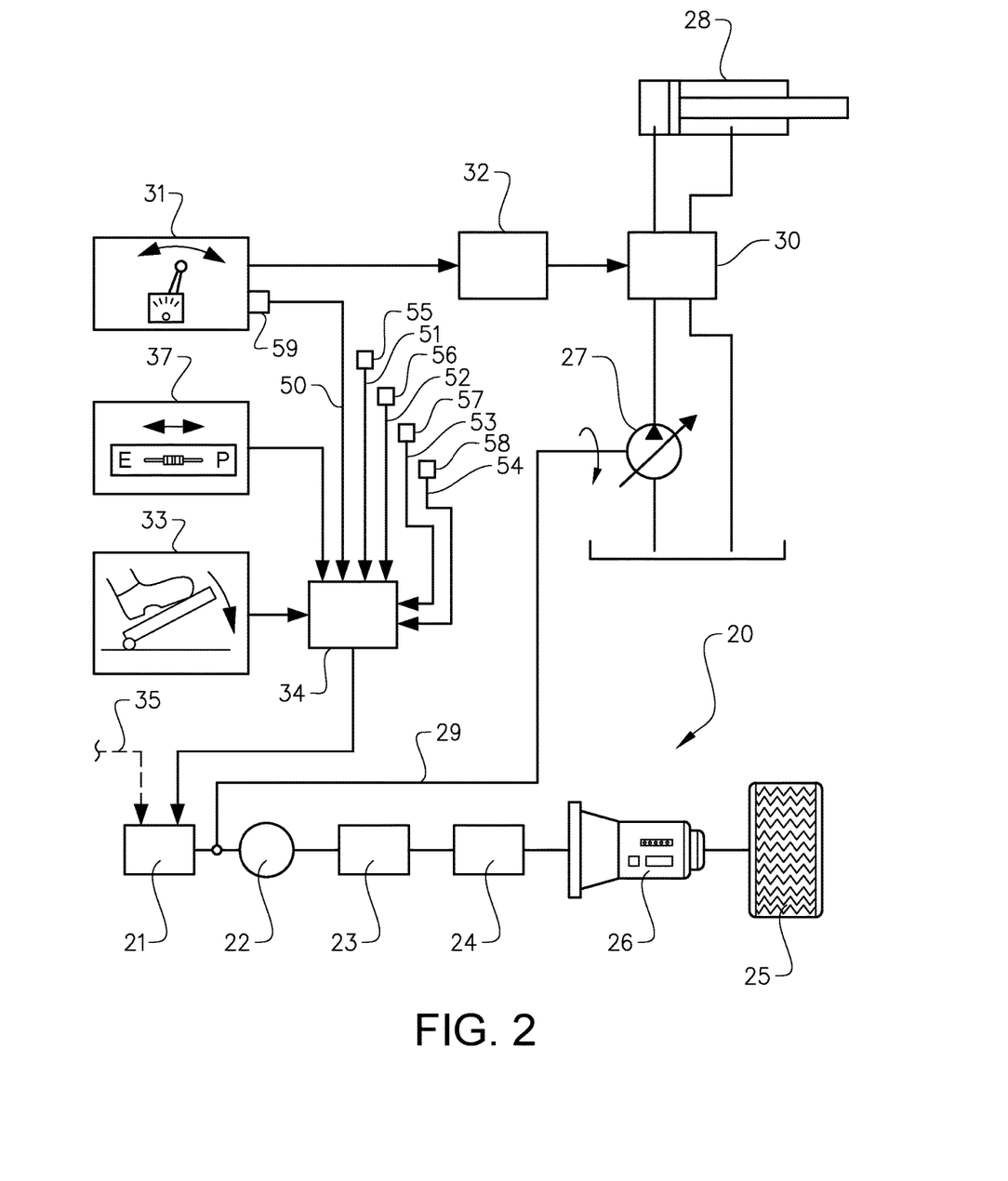
FIG. 2 is a schematically illustrated driveline of the working machine according to the invention.

FIG. 2 is a schematic illustration of an example embodiment of a driveline 20 that can be used in a working machine according to the invention. The working machine comprises an internal combustion engine 21, an electric generator 22, an energy storage 23 and an electric motor 24 for driving one or more wheels 25 of the working machine. The internal combustion engine 21 is arranged to drive the generator 22 and the generator is arranged to supply electric power to the electric motor 24 via the energy storage 23. The internal combustion engine 21 is thus mechanically connected to the electrical generator 22. The electric generator 22 is electrically connected to the energy storage 23 which in turn is electrically connected to the electric motor 24. The electric motor 24 in turn is mechanically connected to the driving wheels 25 of the working machine, preferably via a gear box 26. Although the generator 22 could also supply energy directly to the electric motor 24, at least some or preferably the entire power is transmitted via the energy storage 23. The energy storage 23 can suitably comprise an electric battery and/or super capacity for storing the electric energy.

Also other machine configurations are possible within the scope of the invention. For example, several electric motors could be used as hub motors, each of which electric motors drives a wheel.

Furthermore, the working machine comprises a hydraulic pump 27 for providing a hydraulic actuator 28 with hydraulic fluid as described hereinabove. The hydraulic pump 27 has a drive source 21 different from the electric motor 24. The drive source can for example be the internal combustion engine or a further electric motor or other suitable drive source. In the example embodiment illustrated in FIG. 2, the hydraulic pump 27 is driven by the internal combustion engine 21 by means of a power take off (PTO) 29 arranged between the internal combustion engine 21 and the electric generator 22. As also is illustrated in FIG. 2, the flow of hydraulic fluid to and from the actuator 28 is controlled by a control valve 30. Such a control valve 30 is used in an LS-system for supplying and draining hydraulic fluid to/from the actuator 28. When operating the actuator 28, the operator activates a lever 31 which transmits a signal to a valve control unit 32. The valve control unit 32 in turn transmits signals for opening the control valve 30 in accordance with the lever stroke. Of course the hydraulic system can comprise one or more different actuators, such as hydraulic cylinders.

The working machine further comprises an accelerator 33 for controlling the electric motor 24 and thereby the speed and/or traction force of the driving wheels 25. The accelerator 33 can be any kind of pedal, lever or other equipment manoeuvrable by an operator of the working machine. In FIG. 2, the control signal from the accelerator 33 to the electric motor 24 has been omitted. The accelerator 33 is however used for controlling the electric motor 24 for propulsion of the working machine. Although not illustrated, this means that a motor control unit will receive signals from the accelerator and control the electric motor accordingly.

According to the invention, the accelerator 33 is also arranged for controlling the speed of the hydraulic pump 27 by controlling the speed of the driving, source 21 of the hydraulic pump 27, here the internal combustion engine 21. As illustrated in FIG. 2, a driving source control unit 34 receives a signal from the accelerator pedal arrangement 33 and controls the internal combustion engine 21 for obtaining the desired speed of the hydraulic pump 27.

The valve control unit 32 and the driving source control unit 34 could be separate units or integrated in the same unit. In the same way, the motor control unit for controlling the electric motor 24 could be a separated unit or be combined with other control units.

It should be stressed that the speed control of the internal combustion engine 21 is performed for controlling the speed of the hydraulic pump 27. Of course there may however also be other demands on the internal combustion engine 21 for a certain speed, for example from the driveline for providing power to the energy storage 23 and/or the driving wheels 25, as schematically indicated by the dashed line arrow 35 in FIG. 2. Such a demand could also be dependent on the accelerator stroke. In such a case where there are different demands on the internal combustion engine speed, the internal combustion engine 21 will be controlled to the highest speed that is required.

In any way, during some operation conditions the pump speed control will set the speed of the internal combustion engine 21 and in these cases the arithmetical link between the pump speed and the accelerator stroke is preferably such that the greater accelerator stroke, the higher pump speed, at least for a specific interval between a minimum pump speed and a maximal pump speed.

Figure 3:
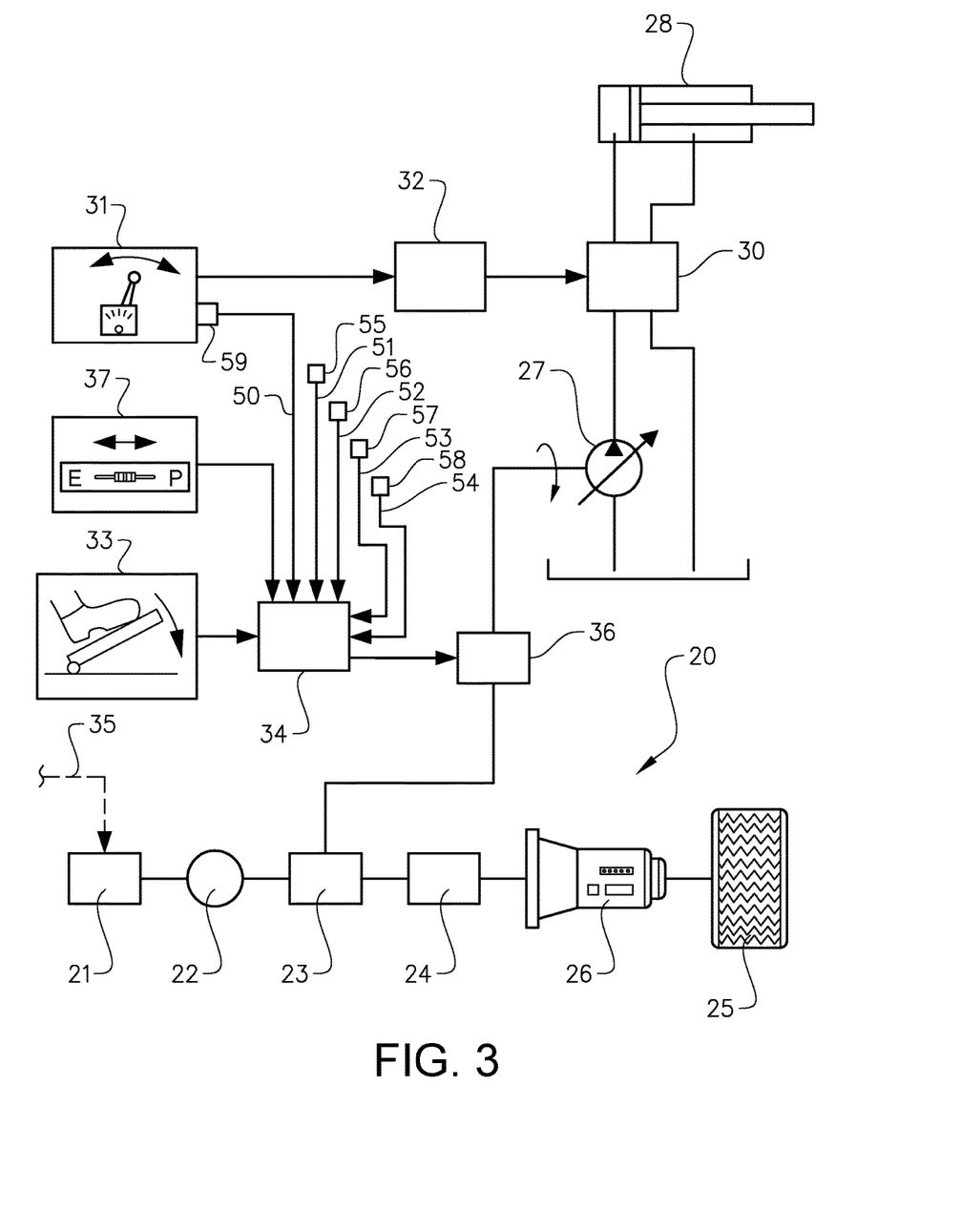
FIG. 3 is a variant of the driveline in FIG. 2.

FIG. 3 shows a variant of the driveline illustrated in FIG. 2. In this example embodiment the working machine comprises a further electric motor 36 and the hydraulic pump 27 is driven by this further electric motor 36. Thus, the accelerator 33 is arranged for controlling the speed of the hydraulic pump 27 by controlling the speed of said further electric motor 36. The generator 22 is preferably arranged to supply power to the further electric motor 36 via the energy storage 23.

In this case it is not any other demand on the drive source 36 of the hydraulic pump 27, and the speed control of the hydraulic pump 27 can usually be performed independently of any demands from the driveline 20 on the internal combustion engine 21. Of course the energy storage 23 has to be charged to a sufficient level for providing also the further electric motor 36 with energy and there may be an indirect dependency to the operation of the driveline 20 and/or the internal combustion engine 21 if the state of charge of the energy storage 23 is not sufficient for providing the energy required by the hydraulics.

With reference to both FIGS. 2 and 3, as already mentioned the pump speed will be a function of the accelerator stroke. This means that the position to which for example an accelerator pedal has been moved gives a certain pump speed. As will be described further hereinafter, the pump speed can however be dependent on other parameters which also can be used to affect the curve of the pump speed versus accelerator pedal position.

Preferably, a control element 37 for selecting between machine performance and fuel save by an operator of the working machine is provided. By "machine performance" is meant the flow of hydraulic fluid available by means of the hydraulic pump 27 at a given pump pressure. The power P is $P=Q*PL$, where Q=flow and PL=load pressure. Since the load pressure is determined by the actual load (weight) on the actuator and cannot be selected, restriction of the power used, to the hydraulics is performed by restriction of the flow. The flow in turn is dependent on the pump speed and the pump displacement. For a given flow the losses of energy ca be reduced by selecting a relatively great displacement and a relatively low pump speed.

Figure 4:
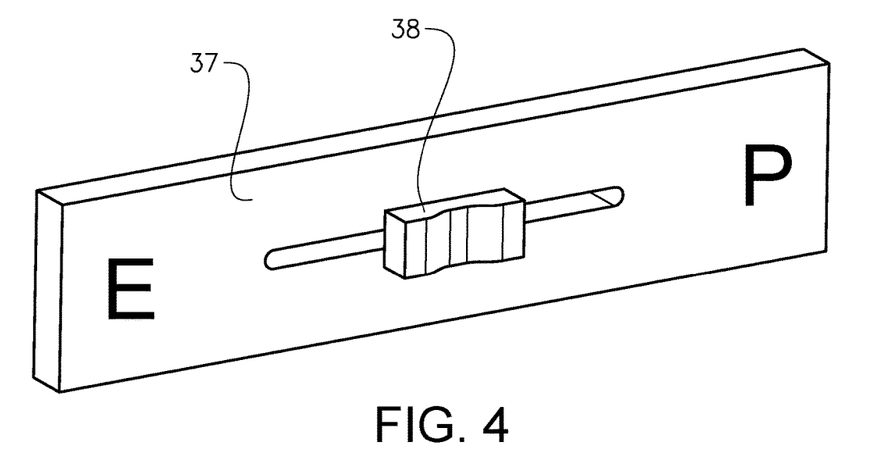
FIG. 4 is a control element according to the invention.

The control element 37 is designed such that a selected increased machine performance and a decreased fuel save correspond to a higher available speed of the hydraulic pump 27 and a selected decreased machine performance and an increased fuel save correspond to a lower available speed of the hydraulic pump 27. Such a control lever 37 can be arranged on a switch panel inside the cabin of the working machine 1. The operator is hereby able to prioritize machine performance or fuel save depending on the current working operation to be performed. For example, the selection of machine performance or fuel save could displace the pump speed curve (that is a function of the accelerator stroke) towards increased and decreased pump speed, respectively. As an example, illustrated in FIG. 4, the control element 37 can comprise a button 38 that can be slid to the right for increased "Performance" (increased available pump speed) P and to the left for fuel save or "Economy" (decreased available pump speed) E, or vice versa as regards the slide directions.

Figure 5:
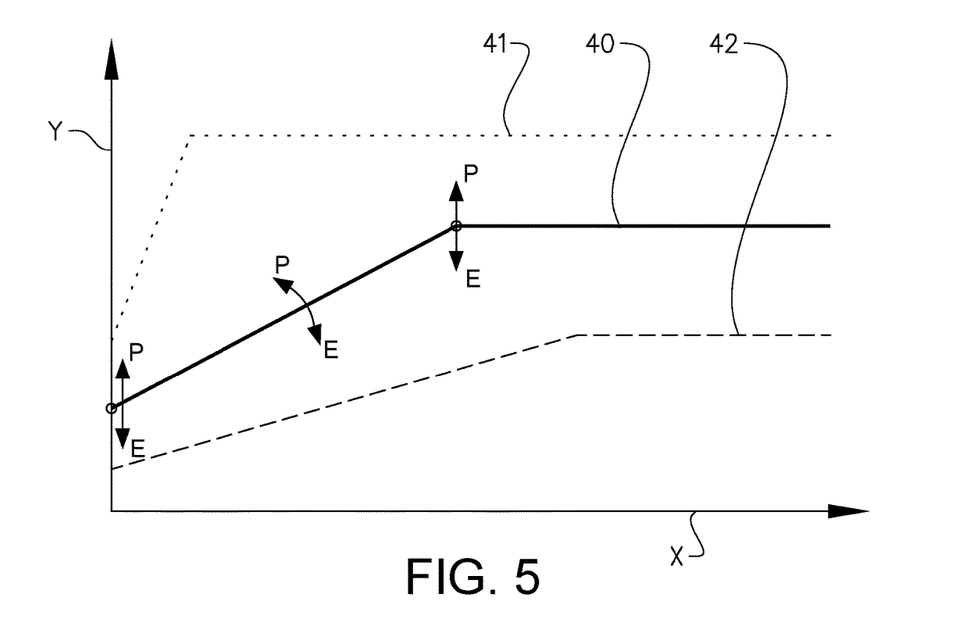
FIG. 5 is a graph illustrating curves for hydraulic pump speed versus accelerator stroke.

FIG. 5 is a graph illustrating curves for hydraulic pump speed versus accelerator stroke. The vertical axis Y represents the pump speed (rpm) and the horizontal axis X represents the accelerator position. The solid line 40 shows a curve of pump speed versus accelerator stroke for an adjustment of the control element 37 somewhere between the extreme positions for "Economy" and "Performance". In general, the speed control of the hydraulic pump is configured such that the greater accelerator stroke, the higher pump speed. The speed control of the hydraulic pump is preferably configured such that below a predetermined threshold value for the accelerator stroke, a minimum pump speed is achieved independently of the accelerator pedal stroke. In the illustrated example, for zero or minimum accelerator stroke, the available pump speed has a minimum value which can be zero or another relatively low speed, such as the idling speed of the ICE. In case the drive source of the pump is the internal combustion engine, the minimum pump speed will probably not be zero since the ICE has to be driven for providing power to the driveline, whereas in case the drive source of the pump is the further electric motor the minimum pump speed could at least theoretically be zero.

Furthermore, the speed control of the hydraulic pump is preferably configured such that over a predetermined threshold value for the accelerator stroke, a maximal pump speed is achieved independently of the accelerator pedal stroke. In the illustrated example the maximal pump speed of the solid curve 40 is illustrated by the horizontal line. This pump speed is relatively high, such as for example in the range 1000-2000 rpm. The control element function can be designed such that an increased selected performance will increase the minimum pump speed, the maximal pump speed and/or the slope (derivative) of the curve, whereas an increased selected fuel save will decrease the minimum pump speed, the maximal pump speed and/or the slope (derivative) of the curve. The upper dashed curve 41 in FIG. 5 illustrates the pump speed as a function of the accelerator stroke for increased performance relative to the solid curve 40, for example maximal "Performance". The lower dashed curve 42 in FIG. 5 illustrates the pump speed as a function of the accelerator stroke for decreased performance relative to the solid curve 40, for example maximal "Economy". Furthermore, in other embodiments of the invention the pump speed curve does not need to be a linear function of the accelerator stroke, but the curves may vary differently having a varying derivative.

In a similar way as the selection between performance and fuel save will affect the pump speed curve, the pump speed curve can be modified, such as displaced up or down for instance, by impact of other parameters. See FIGS. 2 and 3 where signals 50, 51, 52, 53 and 54 of some of these other parameters are transmitted to the driving source control unit 34. In other words, the pump speed versus accelerator stroke curve can be modified by the parameters discussed hereinafter, such as driveline speed, gear position, power or torque transmitted by the driveline, activation of braking devices, activation of hydraulics, etc.

The working machine can have a means 55 for detecting the speed of the drive line 20 of the working machine 1 or the velocity of the working machine. The speed control of the hydraulic pump 27 can be dependent on the determined driveline speed. For example, the speed can be received from any type of revolution counter 55. The speed control of the hydraulic pump is preferably configured such that the greater determined driveline speed, the higher pump speed.

The working machine can have a means 56 for determining a gear position of the working machine, and the speed control of the hydraulic pump 27 can be dependent on the determined gear position. A signal indicative of the current gear can be received from an electric circuit 56 giving a signal indicative of the position of a gear shift device. The speed control of the hydraulic pump is preferably configured such that the maximal pump speed is dependent on the determined gear position. Suitably, the speed control of the hydraulic pump is configured such that the maximal pump speed is highest for gear neutral (as compared to other gears) when the power demand from the driveline normally is lowest.

The working machine can have a means 57 for determining the power or torque transmitted by the drive line of the working machine. The speed control of the hydraulic pump can be dependent on the determined power or torque. A signal indicative of the power or torque can be derived from the current and voltage consumed by the electric motor 24, for example from an electric regulator 57 arranged for controlling the electric motor 24 the working machine. The speed control of the hydraulic pump is preferably configured such that the greater determined power or torque transmitted by the driveline, the lower pump speed. The speed control of the hydraulic pump cats be configured such that the greater determined power or torque transmitted by the driveline, the lower maximal pump speed.

The working machine can have a means 58 for determining activation of a braking device of the working machine. The speed control of the hydraulic pump can be dependent on whether or not the braking device has been activated. For example a pressure sensor 58 measuring the brake oil pressure can be used for deciding whether or not the braking device has been activated. The speed control of the hydraulic pump can be configured such that the maximal pump speed is higher for an activated braking device than for an inactivated braking device.

In addition, as already mentioned the working machine can have an operator control means 31, such as a lever, for activation of the hydraulics. The working machine can also have a means 59 for determining the stroke of a hydraulic lever 31 of the working machine, and the speed control of the hydraulic pump 27 can be dependent on the determined hydraulic lever stroke, i.e. hydraulic lever position. The speed control of the hydraulic pump 27 is preferably configured such that the greater determined hydraulic lever stroke, the higher pump speed. A signal 50 indicative of the current hydraulic lever position can be received from an electric circuit 59. This signal indicative of the position of the hydraulic lever 31 can be transmitted to the driving source control unit 34. This signal is usually already created also for controlling the main control valve 30 by means of the valve control unit 32.

It should be stressed that this is not in contradiction to the basic control of the pump speed as a function of the accelerator stroke, the activation of the hydraulics could for example be used for increase the minimum pump speed to a certain level for enabling a fast response of the hydraulics.

Finally, the pump speed curve as a function of the accelerator stroke can be adapted to or off-set by the current operation or phase of operation to be performed with the working machine. The operation or phase of operation can be input manually to the control unit or indicated, by any suitable operating or system parameter, such as power or torque to the driveline, power or torque to hydraulics, gear, machine velocity, hydraulic lever position, hydraulic cylinder position, etc.

All features and variants discussed hereinabove with reference to the working machine can be applied partly or entirely in connection to the control unit, the method and/or the control element according to the invention described hereinafter.

Figure 6:
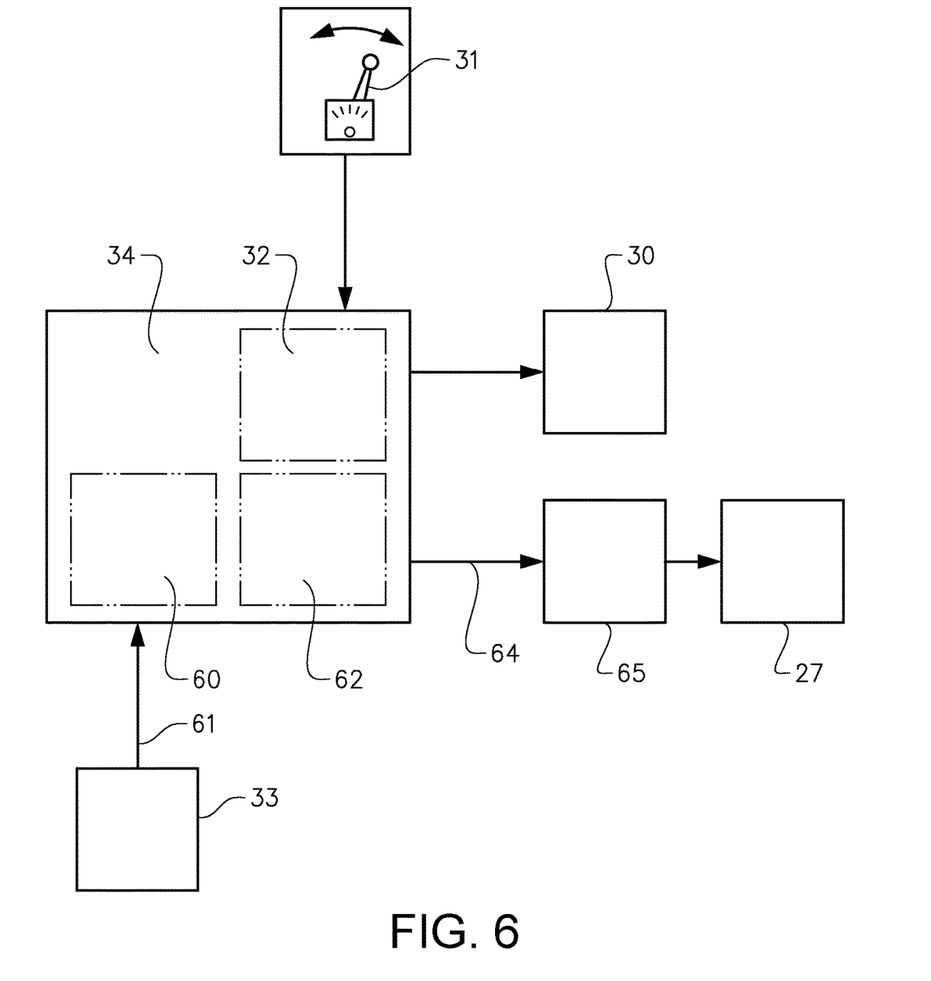
FIG. 6 is a schematically illustrated example embodiment of the control, unit according to the invention.

As mentioned, the invention also relates to a control unit, herein mentioned as driving source control unit 34. In FIG. 6 one embodiment of the control unit 34 according to the invention is shown. For some features of the control unit and for the features of the working machine described in connection with the control unit, reference is made also to FIGS. 2 and 3. Hereinafter, mainly features and functions unique for the control unit will be described in detail. Same reference numerals used in FIG. 6 as in FIGS. 2 and 3 will indicate same or similar components as already described with reference to FIGS. 2 and 3, and hereinafter some of these components will only be briefly described or not described at all. The control unit 34 may further implement any of the other features described hereinabove, particularly with reference to FIGS. 4 and 5.

The control unit 34 comprises an accelerator module 60 for receiving a signal 61 indicative of the accelerator stroke 33, and a hydraulic pump module 62 for transmitting a signal 64 for controlling the speed of the hydraulic pump 27 based on the accelerator stroke signal 61. The signal for controlling the speed of the pump is transmitted to the drive source 65 of the pump. As described hereinabove, the drive source 65 can be the internal combustion engine 21 or a further electric motor 36 driving the pump. Thus, the hydraulic pump module 62 can be configured to control the speed of the hydraulic pump by controlling the speed of the internal combustion engine 21 or the further electric motor 36. In the example embodiment illustrated in FIG. 6, also the valve control unit 32 is integrated in the driving source control unit 34. The driving source control unit 34 can be a part of a main control unit or a separate unit that communicates with the main control unit.

The invention also relates to a method for controlling a working machine. Although an example embodiment of the method will be described herein with reference to the flowchart in FIG. 7, the method may further implement any of the other features described hereinabove, particularly with reference to FIGS. 4 and 5. For the components of the working machine reference numerals associated with FIGS. 2 and 3 will be used.

The method according to the invention comprises controlling both the electric motor and the speed of the hydraulic pump by means of the accelerator.

Figure 7:
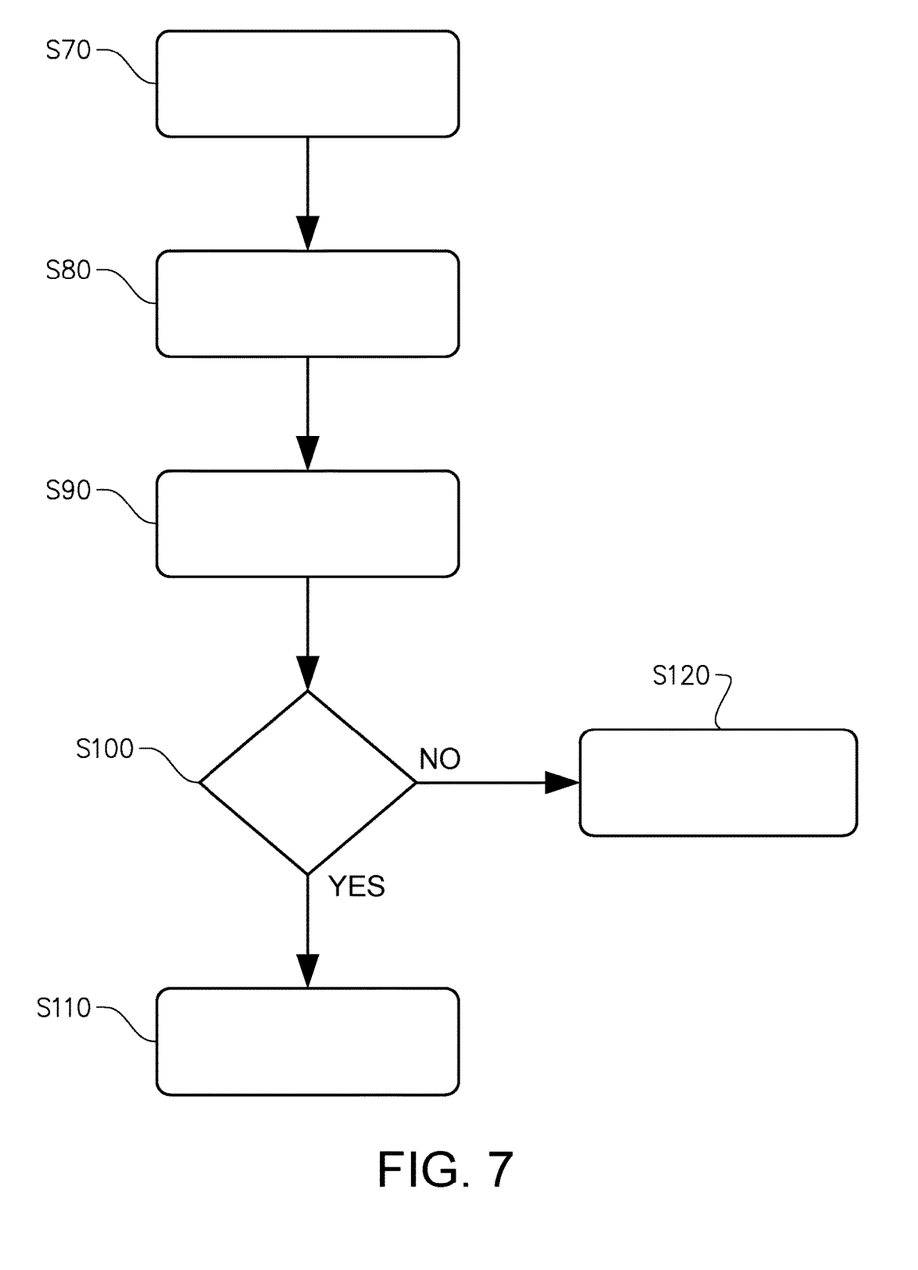
FIG. 7 is a flowchart of one embodiment of the method according to the invention.

In the example embodiment illustrated in FIG. 7, the method is applied on an operation where an operator wants to increase the pump speed temporarily by activating the braking device and the accelerator pedal of the working machine at the same time. In a first step S70, the control unit 34 receives a signal indicative of that the braking device has been activated. In a second step S80, the control unit 34 receives a signal indicative of the accelerator stroke from the accelerator pedal arrangement 33. In the next step S90, the control unit checks current gear by receiving a signal from a gear shift device for instance and the velocity of the working machine by receiving a signal from a revolution counter arranged on the driveline for instance.

As indicated in S100, if a gear (not gear neutral) is activated and the working machine velocity is below a threshold value, for example 5 km/h, a pump speed versus accelerator stroke curve giving an increased pump speed is provided in next step S110. Otherwise, if the machine velocity is not below the threshold value, the pump speed curve is not changed, but is controlled S120 in accordance with the accelerator stroke and any other conditions without any dependency on the activation of the braking device.

It is to be understood that the present invention is not limited to the embodiments described above and illustrated in the drawings; rather, the skilled person will recognize that many changes and modifications may be made within the scope of the appended claims.

The invention claimed is:

1. A working machine comprising an internal combustion engine, a generator, an energy storage and an electric motor for driving one or more wheels of the working machine, the internal combustion engine being arranged to drive the generator and the generator being arranged to supply power to the electric motor via the energy storage, the working machine further comprising an accelerator for controlling the electric motor, and a hydraulic pump for driving a hydraulic actuator, wherein the hydraulic pump is directly driven by the internal combustion engine, and the accelerator is arranged for controlling the speed (if the hydraulic pump by controlling the speed off the internal combustion engine, wherein the speed control of the hydraulic pump is configured such that a greater accelerator stroke corresponds to a higher pump speed.

2. A working machine according to claim 1, wherein the energy storage comprises an electric battery and/or a super capacitor.

3. A working machine according to claim 1, wherein the speed control of the hydraulic pump is configured such that over a predetermined threshold value for the accelerator stroke, a maximal pump speed is achieved independently of the accelerator pedal stroke.

4. A working machine according to claim 1, wherein the speed control of the hydraulic pump is configured such that below a predetermined threshold value for the accelerator stroke, a minimum pump speed is achieved independently of the accelerator pedal stroke.

5. A working machine according to claim 1, wherein the working machine has a means for determining the speed of the driveline of the working machine, and the speed control of the hydraulic pump is dependent on the determined driveline speed.

6. A working machine according to claim 5, wherein the speed control of the hydraulic pump is configured such that a greater determined driveline speed corresponds to the higher pump speed.

7. A working machine according to claim 1, wherein the working machine has a means for determining a gear position of the working machine, and the speed control of the hydraulic pump is dependent on the determined gear position.

8. A working machine according to claim 7, wherein the speed control of the hydraulic pump is configured such that the maximal pump speed is dependent on the determined gear position.

9. A working machine according to claim 8, wherein the speed control of the hydraulic pump is configured such that the maximal pump speed is highest for gear neutral.

10. A working machine according to claim 1, wherein the working machine has a means for determining the power or torque transmitted by the driveline of the working machine, and the speed control of the hydraulic pump is dependent on the determined power or torque.

11. A working machine according to claim 10, wherein the speed control of the hydraulic pump is configured such that a greater determined power or torque corresponds to a lower pump speed.

12. A working machine according to claim 10, wherein the speed control of the hydraulic pump is configured such that the maximal pump speed is dependent on the determined power or torque.

13. A working machine according to claim 12, wherein the speed control of the hydraulic pump is configured such that the greater determined power or torque, the lower maximal pump speed.

14. A working machine according to claim 1, wherein the working machine has a means for determining activation of a braking device of the working machine, and the speed control of the hydraulic pump is dependent on whether or not the braking device has been activated.

15. A working machine according to claim 14, wherein the speed control of the hydraulic pump is configured such that the maximal pump speed is higher for an activated braking device than for an inactivated braking device.

16. A working machine according to claim 1, wherein the working machine has a means for determining the stroke of a hydraulic lever of the working machine, and the speed control of the hydraulic pump is dependent on the determined hydraulic lever stroke.

17. A working machine according to claim 16, wherein the speed control of the hydraulic pump is configured such that a greater determined hydraulic lever stroke corresponds to the higher pump speed.

18. A working machine according to claim 1, wherein the working machine has a control element designed such that a selected increased machine performance and a decreased fuel save correspond to a higher available speed of the hydraulic pump and a selected decreased machine performance and an increased fuel save correspond to a lower available speed of the hydraulic pump.

* * * * *